June 28, 1955  D. E. WILCOX  2,711,590
CAPACITANCE LEVELING CELL
Filed June 5, 1950  2 Sheets-Sheet 1

INVENTOR.
DOYLE E. WILCOX
BY
*William R. Lane*
ATTORNEY

June 28, 1955  D. E. WILCOX  2,711,590
CAPACITANCE LEVELING CELL
Filed June 5, 1950  2 Sheets-Sheet 2

*INVENTOR.*
DOYLE E. WILCOX
BY
*William R. Lane*
ATTORNEY

United States Patent Office 2,711,590
Patented June 28, 1955

2,711,590

CAPACITANCE LEVELING CELL

Doyle E. Wilcox, Rivera, Calif., assignor to North American Aviation, Inc.

Application June 5, 1950, Serial No. 166,280

13 Claims. (Cl. 33—206)

This invention relates to the measuring of a level or departure from level of a surface about two orthogonal axes with reference to a gravity-leveled surface. It specifically relates to an instrument capable of detecting the deviation from parallel of two planes about any two orthogonal axes.

It is an object of this invention to provide a leveling instrument having an output in electrical form.

It is another object of this invention to provide a leveling instrument having an output in electrical form which will facilitate a remote indication or recording of deviations of the instrument from the level position.

It is a further object of this invention to provide an instrument adapted to indicate accurately a departure of a plane from a level attitude.

It is a further object of this invention to provide a device for measuring the extent to which two substantially parallel planes are non-parallel.

It is a further object of this invention to provide a leveling instrument whose operation is not affected by vibration.

It is a further object of this invention to provide a leveling instrument in which damping of a liquid reference surface is employed.

Other objects of invention will become apparent from the following description taken in connection with the accompanying drawings, in which.

Figure 5:
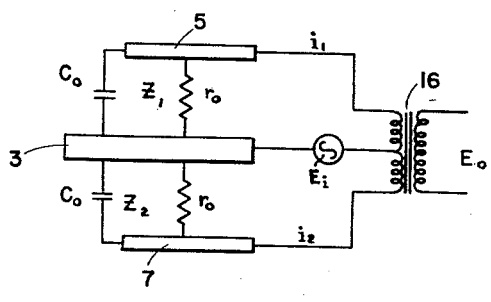

And Fig. 5 is a generalized schematic diagram of the invention.

Figure 1:
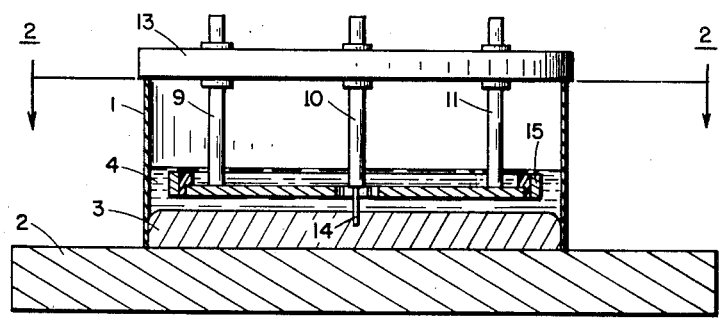
Fig. 1 is a sectional view of the invention.
Figure 2:
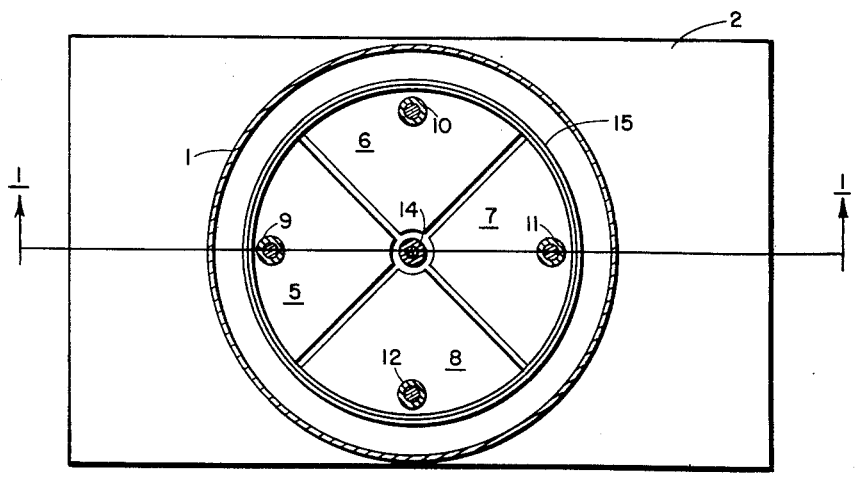
Fig. 2 is a plan view of the invention partially cut away.

Referring to the drawings, and specifically to Fig. 1, a vessel is supported on a base 2 and contains a quantity of mercury 3, or some other conducting fluid. Also contained in vessel 1 and above mercury 3 is a damping medium comprising a layer of oil 4 such as mineral oil or glycerin. Quadrant plates 5, 6, 7 and 8 arranged to be rigidly parallel are supported on pillars 9, 10, 11 and 12, in turn supported by cover member 13. Cover member 13 is of insulating material, and while pillar members 9, 10, 11 and 12 are of Invar and therefore conduct electricity from quadrant plates 5, 6, 7 and 8 which are of a metallic conducting material, such as stainless steel, which is not damaged by mercury layer 3, these quadrant plates are mutually insulated and separated from each other by a definite space. A metallic probe 14 makes contact with mercury layer 3 in the space between the quadrant plates, as shown in Fig. 2, and a metallic shielding ring 15 provides capacity shielding for the quadrant plates.

Figure 3:
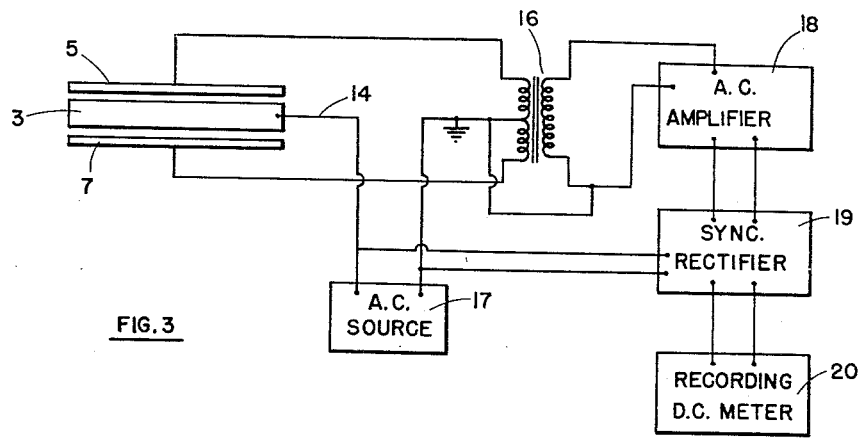
Fig. 3 is a circuit diagram of the invention.

Referring now to Fig. 3, there is shown a schematic circuit diagram for leveling of the device about one axis. It is to be understood that an identical circuit is required for leveling about the other axis. By utilizing a quadrant-shaped configuration for plates 7, 8, 9, and 10 and by connecting each detection circuit to opposite plates, sensitivity on two orthogonal axes is obtained. Each detection circuit indicates the component of the inclination of its plates along a line joining the centroids of area of the pair of plates. Mercury layer 3 is shown in conjunction with quadrant plates 5 and 7 which are connected to the primary of a transformer 16. The center tap of transformer 16 is connected to one side of an alternating current source 17, while mercury layer 3 is connected to the other side of said source by means of probe 14. The secondary of transformer 16 is connected to an A. C. amplifier 18 which, in turn, feeds the synchronous rectifier 19, more fully illustrated in Fig. 4. The output of synchronous rectifier 19 is indicated by a D. C. meter 20 which indicates the extent to which the device is out of level.

In operation the device functions as follows: If plates 5 and 7 are equally spaced from mercury layer 3, the input to transformer 16 is perfectly balanced and no current is induced in the secondary thereof. However, if plate 5 is closer to the mercury layer than is plate 7, the current in the lower half of the primary of transformer 16 will be larger than the current in the upper half, and an alternating current will be induced in the secondary of transformer 16. A signal will therefore be amplified by amplifier 18, rectified by rectifier 19 and indicated by meter 20. This signal is proportional to the angular deviation of the line joining the centroids of area of plates 5 and 7 from a state of being parallel with the surface of mercury layer 3. In order that the proportionality may be strictly maintained, amplifier 18 and synchronous rectifier 19 must be highly linear. While this result is easily achieved by conventional means as to amplifier 18, the provision of the synchronous rectifier whose direct current output is strictly proportional to its A. C. input represents an innovation in the art. Previously known synchronous rectifiers suffer from the defect that their output may be varied by variations in the magnitude of the alternating current exciting voltages, here furnished by alternating current source 17.

Figure 4:
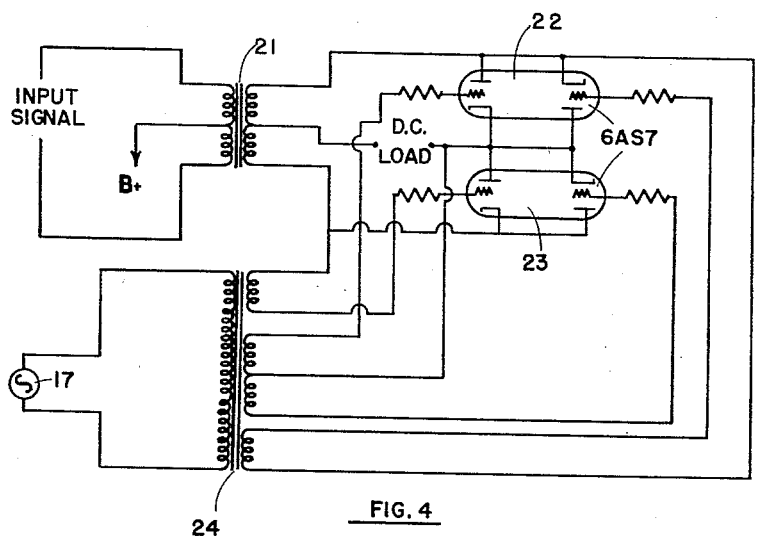
Fig. 4 is a circuit diagram of a synchronous rectifier of this invention.

Referring to Fig. 4 there is shown a circuit diagram for the full-wave synchronous rectifier of this invention. From A. C. amplifier 18 the signal to be rectified is applied to transformer 21. Each side of the secondary of transformer 21 is connected to the plate and cathode, respectively, of a pair of double triodes 22 and 23 which may be of the 6AS7 type as shown in Fig. 4. The grids of the triodes are each excited through resistances by electrically isolated secondary windings on transformer 24, the primary of which is connected across the source of alternating current 17. The peak A. C. voltage across the separate secondaries of transformer 24 is greater than the plate-current cut-off voltage of the triodes for the maximum expected signal voltage developed across transformer 21. The operation of the individual triodes is then as follows: When the phase of the alternating voltage applied to the grid causes the grid potential to be negative with respect to the cathode, the triode presents an infinitely high resistance to the passage of current through it from transformer 21; when the phase of the alternating voltage applied to the grid causes the grid potential to be positive, a small grid current flows, being limited in magnitude by the resistance in the grid circuit, and the triode presents a nearly constant low resistance to the passage of current through it from transformer 21. It is obvious that by properly phasing the triode grid voltages with respect to each other, and the signal voltage from transformer 21, only direct current will flow through the load terminals. It may be seen, therefore, that this synchronous rectifier has two distinct advantages over others known to the art. First, this device requires only an insignificant amount of power from the alternating current source 17; and, second, the direct current delivered to the load is a function of the signal voltage output of transformer 21 and the cosine of the phase angle between the output voltages of transformers 24 and 21, and is not a function of the magnitude of the alternating voltage output of transformer 24. Obviously, a half-wave synchronous rectifier may be constructed, utilizing the principles of the full-wave rectifier shown after a manner well known in the rectifier art generally.

Referring now to Figs. 1 and 2, further features and advantages of the invention are apparent. Oil layer 4 serves three useful purposes in this invention. First, since the dielectric constant of oil is higher than that of air, the effective capacitance between the mercury and quadrant plates 5, 6, 7 and 8 is increased. Second, since the insulating power of oil is greater than that of air, quadrant plates 5, 6, 7 and 8 may be placed more closely to mercury layer 3 for a given potential difference between layer 3 and the quadrant plates than if some other medium such as air were interposed. Third, while mercury has a tendency to vibrate somewhat frictionlessly and without appreciable damping, oil, on the other hand, being somewhat viscous does not have such a great tendency to vibrate or oscillate. The oil, therefore, serves as a damping means for preventing the unwanted vibration or oscillation of the mercury layer so that when the attitude of the invention is changed, the mercury, with a very low viscosity, follows the change very quickly and establishes a new level almost instantaneously; and while the mercury if left alone would tend to oscillate about this position, the super position of the oil over the mercury quickly damps out the vibration of the mercury.

Metallic probe 14 may be inserted down the center of the device, as shown in Fig. 1, or it may be allowed to contact the mercury outside the quadrant plates at any point within vessel 1.

If the damping medium, heretofore referred to as being composed of an oil, has a substantial conductivity, or if the resistance is relatively low in comparison to the capacitance thereof, a generalized circuit of two opposing quadrants of the device may be represented as shown in Fig. 5, where $E_0$ is the output voltage of the transformer; $E_i$ is the sinusoidal input voltage; $J$ is the mathematical impedance operator; $M$ is the mutual inductance of bridge transformer 16; $Z$ is the impedance between a quadrant plate and mercury layer 3; $C_0$ is the capacitance between mercury 3 and either quadrant plate when the device is level; $r_0$ is the resistance between either quadrant plate and mercury 3 when the device is level; $C$ is the change in capacitance between a quadrant plate and mercury 3 when the device is not in level condition; $r$ is the change in resistance between the quadrant plate and mercury 3 when the device is not in level condition; and the remaining quantities are as indicated in Fig. 5. The following equation may then be written:

$$E_0 = J\omega M(i_1 - i_2)$$

where $\omega$ is the angular frequency of the input voltage, and $i_1$ and $i_2$ are currents as indicated in Fig. 5.

But, $$i_1 = E_i \frac{r_0\left(\frac{1}{J\omega C_0}\right)}{r_0 + \frac{1}{J\omega C_0}} = \frac{E_i r_0}{1 + J\omega C_0 r_0} = i_2$$

and, assuming the cell to be tilted so that the impedance of the upper arm of the bridge is $$Z_1 = \frac{(r_0 - r)\frac{1}{J\omega(C_0 + C)}}{r_0 - r + \frac{1}{J\omega(C_0 + C)}} = \frac{r_0 - r}{1 + J\omega(C_0 + C)(r_0 - r)}$$

$$Z_2 = \frac{r_0 + r}{1 + J\omega(C_0 - C)(r_0 + r)}$$

then $$i_1 = \frac{E_i}{Z_1} = E_i \left[\frac{1}{r_0 - r} + J\omega(C_0 + C)\right]$$

$$i_2 = \frac{E_i}{Z_2} = E_i \left[\frac{1}{r_0 + r} + J\omega(C_0 - C)\right]$$

and $$i_1 - i_2 = E_i \left[\frac{1}{r_0 - r} - \frac{1}{r_0 + r} + J\omega(C_0 + C - C_0 + C)\right]$$

$$= E_i \left[\frac{2r}{r_0^2 - r^2} + J\omega(2C)\right]$$

so $$E_0 = E_i \left[J\omega M \frac{2r}{r_0^2 - r_2} - \omega^2 M(2C)\right]$$

For damping media of very high resistivity, such as oils, the first term in this expression is negligible compared to the capacitive term, and the cell operates as a capacitive leveling bridge. The phase shift in the amplifier is then adjusted so that the synchronous rectifier passes only the component of bridge voltage resulting from the capacitive term.

For damping media of comparatively low resistivity the first term in the expression may be large and the second term small. The phase shift through the amplifier is then adjusted so that the synchronous rectifier passes only the component of bridge voltage resulting from the resistive (first) term.

The device is therefore equally usable for damping media having very high resistivity as well as for media having low resistance and relatively negligible capacitance.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for indicating the deviation from a state of being parallel between two planes comprising a container, a layer of mercury in said container, a plurality of flat conductive members all arranged in a single plane and mutually insulated; means for detecting the capacitance between each of said flat members and said mercury; and means for comparing said measured capacitance to thereby indicate deviation of said plane from a condition of being parallel to the plane of the surface of said mercury.

2. A device as recited in claim 1 in which said plurality of flat members comprise four quadrant-shaped, stainless steel plates, and further comprising two resonant bridge circuits, each of said bridge circuits comparing the capacitance between opposite quadrant plates and said mercury whereby measurements of the deviations of said plane from a condition of being parallel to the plane of the surface of said mercury are obtained simultaneously on two orthogonal axes.

3. A device as recited in claim 1 in which said means for comparing said measured capacitance comprises a bridge transformer, an amplifier, a synchronous rectifier and a recording meter connected consecutively whereby said meter indicates instantaneously any departures from said state of being parallel.

4. Means for indicating the deviation from a state of being parallel between two planes comprising a container, a layer of mercury in said container, a second layer of fluid having a high viscosity and a lower conductivity than said mercury above said mercury, a plurality of flat conductive plates all arranged in a single plane and mutually insulated; means for detecting the capacitance between each of said flat plates and said mercury; and means for comparing said measured capacitance to thereby indicate deviation of said plane from a condition of being parallel to the plane of the surface of said mercury.

5. Means for detecting the deviation of a plane from a gravity-level position comprising a container, a layer of mercury in said container, four quadrant-shaped flat metallic plates arranged symmetrically in a single plane adjacent to but not touching said mercury; a layer of fluid having a higher viscosity and a lower conductivity than said mercury above said mercury and surrounding said quadrant plates; and means for detecting variations in capacitance between opposing pairs of said quadrant plates and said mercury to thereby indicate deviation from level attitude of said quadrant plates about two axes.

6. A device as recited in claim 5 in which said means for detecting variations in capacitance between opposing pairs of said quadrant plates and said mercury comprises a source of alternating current and a bridge transformer with the ends of its primary winding connected to said quadrant plates and the center tap of its primary winding connected to one side of said alternating current source whereby the output of the secondary winding of said transformer is proportional to the magnitude of said deviations from level.

7. Means for producing an electrical signal proportional to the deviation of a plane from a gravity-level orientation comprising a container, a layer of conducting fluid within said container, a plurality of separate flat plates mutually insulated and positioned with their lower surfaces above said layer, said lower surfaces of said plates defining a plane—the deviation from a gravity-level orientation of which is desired; and electrical means having an output in direct current form for determining differences in the distances from each said plate to said fluid layer to thereby produce a direct current proportional to the deviation of said plane from a gravity-level orientation.

8. A device as recited in claim 7 in which said electrical means comprises a source of alternating current, a bridge transformer having its primary winding connected between said plates and having the center tap of its primary winding connected to said alternating current source, an alternating current amplifier fed by the output of said bridge transformer, a synchronous rectifier for converting into direct current form the output of said transformer without destroying the proportionality of the said resulting electrical output to the angular deviation of said plates from the surface of said conducting fluid, and a direct current meter adapted to move in response to the output of said synchronous rectifier to thereby produce a direct current indication proportional to the deviation of the plane of said plates from a gravity-level orientation.

9. A device as recited in claim 7 and further comprising a layer of fluid having a higher velocity and a lower conductivity than said conducting fluid over said conducting fluid layer to thereby damp out unwanted vibrations of said conducting fluid layer.

10. Means for indicating the deviation of a plane from gravity-level orientation comprising a container; a layer of conductive fluid therein; four conductive elements mutually insulated and defining a plane generally above the surface of said conductive fluid; a source of alternating current; a bridge transformer having its primary winding connected to two of said elements, and the center tap of its primary winding connected to one side of said alternating current source, the other side of said alternating current source being connected to said conducting fluid; a second bridge transformer having its primary winding connected to the other two of said elements and the center tap of its primary winding connected to one side of said alternating current source, whereby the outputs of the secondaries of said bridge transformers are proportional to the deviation of the plane of said elements from gravity-level orientation about axes normal to lines drawn through the centroids of area of each pair of elements.

11. A device as recited in claim 10 and further comprising a layer of fluid having a greater viscosity than said conducting fluid to thereby damp out unwanted vibrations of said conducting fluid.

12. Means for determining deviation of a plane from a gravity-level orientation comprising a container; a conducting fluid in said container; a layer of fluid above said conducting fluid having a viscosity greater than that of said conducting fluid and having predetermined impedance characteristics; a plurality of mutually insulated conductive rigid elements having substantially flat lower surfaces and positioned above said conducting fluid, the lower surfaces of said elements defining a plane; and electrical means for detecting variations in impedance between said conductive elements and said conducting fluid when the orientation of the plane of said elements is varied to thereby indicate deviations from gravity-level orientation of said plane.

13. A device as recited in claim 12 in which said second-named fluid is a good dielectric and in which said impedance indicating means comprises means for determining variations in the capacitance between said elements and said conducting fluid to thereby indicate deviations of said plane from gravity-level orientation.

References Cited in the file of this patent

UNITED STATES PATENTS

| | | |
|---|---|---|
| 1,007,998 | Whalton | Nov. 7, 1911 |
| 1,928,971 | Dillon et al. | Oct. 3, 1933 |
| 2,147,746 | Luck | Feb. 21, 1939 |
| 2,252,727 | Pepper | Aug. 19, 1941 |
| 2,262,245 | Mosley | Nov. 11, 1941 |
| 2,319,940 | Marrison | May 25, 1943 |
| 2,364,079 | Klemperer | Dec. 5, 1944 |
| 2,438,758 | Leach | Mar. 30, 1948 |
| 2,438,831 | Sziklai | Mar. 30, 1948 |
| 2,456,619 | Curry | Dec. 21, 1948 |
| 2,532,883 | Bennett et al. | Dec. 5, 1950 |
| 2,611,021 | Perls | Sept. 16, 1952 |

FOREIGN PATENTS

| | | |
|---|---|---|
| 243,318 | Great Britain | Dec. 20, 1926 |